United States Patent [19]
Grundei et al.

[11] Patent Number: 5,730,263
[45] Date of Patent: Mar. 24, 1998

[54] VIBRATION DAMPER

[75] Inventors: Manfred Grundei, Niederwerrn; Günther Braun, Geldersheim; Otto Samonil, Niederwerrn; Sabine Lack, Schweinfurt, all of Germany

[73] Assignee: Fichtel & Sachs AG, Schweinfurt, Germany

[21] Appl. No.: 711,552

[22] Filed: Sep. 10, 1996

[30]     Foreign Application Priority Data

Sep. 11, 1995  [DE]  Germany ............ 195 33 328.4

[51] Int. Cl.⁶ ..................................................... F16F 9/36
[52] U.S. Cl. ............................ 188/322.18; 188/322.15; 277/160
[58] Field of Search ...................... 188/322.15, 322.16, 188/322.18; 92/129, 172, 240, 242; 277/138, 205, 173, 206 R, 212 C, 174, 177, 199, 160

[56]              References Cited

U.S. PATENT DOCUMENTS

| 1,484,578 | 2/1924 | Small | 277/160 |
| 2,579,699 | 12/1951 | Phillips | 277/160 |
| 2,719,767 | 10/1955 | Ernest | 277/160 |
| 3,184,245 | 5/1965 | Woolcott | 277/160 |

FOREIGN PATENT DOCUMENTS 4410996  6/1995  Germany.

Primary Examiner—Robert J. Oberleitner
Assistant Examiner—C. T. Bartz
Attorney, Agent, or Firm—Nils H. Ljungman and Associates

[57]                ABSTRACT

A vibration damper includes a pressure tube in which a piston on a piston rod which can move axially is guided by means of a piston rod guide which closes the pressure tube. The piston divides the pressure tube which is filled with damping medium into two working chambers. A piston ring which covers a peripheral area of the piston has an essentially U-shaped cross section with retaining surfaces, whereby the retaining surfaces are supported on the upper and lower side of the piston. On at least one side of the piston, at least a portion of the piston on which the retaining surfaces of the piston ring are engaged has a profiled surface. The profiled surface is configured such that the distance between one side of the piston and a hypothetical reference plane which runs parallel to the piston side is alternately less than and greater than a specified size of fit.

20 Claims, 4 Drawing Sheets

VIBRATION DAMPER

BACKGROUND OF THE INVENTION

1. Field of the Invention

The present invention relates to a vibration damper having a pressure tube in which a piston on a piston rod can move. The piston rod can move axially and is guided by means of a piston rod guide which closes the pressure tube. The piston divides the pressure tube, which is filled with damping medium, into two chambers. A piston ring covers a peripheral area of the piston and has an essentially U-shaped cross section with retaining surfaces that are supported on the upper and lower sides of the piston.

2. Background Information

German Patent No. 44 10 996 describes a piston, the piston ring of which has an essentially U-shaped cross section and is supported by means of retaining surfaces on the upper and lower sides of the piston. This type of piston ring eliminates the complex turning of a ring-shaped groove for the piston ring. In contrast, however, there is the problem that the distance between the upper side of the piston and the lower side of the piston must be kept exactly constant, so that the piston ring is not compressed or subjected to axial gaps. Of course, the piston ring could be connected to the piston by means of an injection molding or spraying process, but attempts are increasingly being made to dispose of vibration dampers in a more "environmentally friendly" manner. These efforts include attempts to keep the materials used separable, which becomes complicated if the piston rings are attached by means of an injection process.

A further disadvantage which afflicts piston rings which have been attached using the injection method is that the range of materials which can be used is limited on account of the required injection properties of the material. Unfortunately, it is not possible to connect common PTFE piston rings, which have a particularly low coefficient of friction, to the piston by injection processes.

German Patent No. 195 01 792 7-12 describes a piston ring which also has a U-shaped cross section, but its retaining surfaces have been transformed into spring ends. The spring ends compensate for the unavoidable fluctuations between the upper side of the piston and the lower side which result from manufacturing tolerances. It is readily apparent, however, that a piston ring of this type is difficult to manufacture.

OBJECT OF THE INVENTION

The object of the present invention is to fasten a piston ring on a piston which does not have a piston ring groove, whereby the axial clearance is eliminated as much as possible, and the selection of materials is essentially unrestricted. The present invention also makes it possible to remove the piston ring from the piston easily.

SUMMARY OF THE INVENTION

The present invention teaches that this object can be accomplished if, on at least one side of the piston, at least one portion of the piston on which the retaining surfaces of the piston ring are engaged has a profiled surface, so that the distance between one side Of the piston and an imaginary reference plane which runs parallel to the piston side is alternately greater than or less than a specified size of fit.

Compared to known fabrications, not only is it possible to achieve a significantly enlarged tolerance range for a specified size of fit, but it is even possible to deliberately use a size of fit which does not correspond to the rule described above. The size of fit is achieved at the transition points of the profiling, and a clearance-free fastening of the piston ring is achieved without a force fit or interference fit between the piston and the piston ring. A force fit would be undesirable, in particular with regard to the inevitable thermal expansion of the piston ring.

In an additional advantageous configuration, the profiling can be realized on the underside and on the upper side of the piston. The depth of the profile can thereby be doubled. The result is a range of dimensions for the depth of the profiling which becomes easier to handle.

In a further additional advantageous configuration, the profiling of the surface can preferably be realized so that the surface is alternately less than and greater than the size of fit in the peripheral direction of the piston. As a result of the configuration in the peripheral direction, the piston ring can be deformed over a relatively long length. The result is very low stresses which are easily equalized by the natural elasticity of the piston ring.

In a yet additional advantageous configuration, the profiles on the surfaces on the upper and lower sides of the piston can be preferably oriented with respect to one another so that starting from an imaginary reference plane, there is an elevation on the one side of the piston, and there is a depression on the side of the piston which is opposite in the axial direction. In that case, if the elevation on the one side of the piston is exactly as high as the depth of the depression on the axially opposite side of the piston, the stresses in the piston ring can be essentially reduced to a minimum.

An additional advantage with regard to the surface pressure between the piston ring and the piston can be achieved if the elevations and depressions on the sides of the piston are flat. It thereby becomes possible to reliably prevent any spot contact. In a consistent refinement of the teaching of the invention, the sequence of elevations and depressions can correspond to a constant mathematical function. For the same purpose, the profiling toward the radial inside of the piston can have an essentially constant height.

If the piston has passage channels which connect the two working chambers to one another, whereby the passage channels are each covered at their outlet openings by at least one valve disc, the profiling is oriented in relation to the outlet openings so that there is a depression in the vicinity of the inlet openings. The valve discs used are preferably closed cover plates, either in the form of flexible discs or in the form of rigid discs. The inlet openings into the passage channels are frequently covered by the valve discs, so that as a result of a lowering of the inlet openings or an elevation of the contact surfaces for the valve discs on the outlet openings, radial inflow paths to the inlet openings are created. As a result of the depression in the vicinity of the inlet opening, the piston ring is axially displaced over a portion of the periphery of the valve disc, whereby the cross section of the inflow path is enlarged.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the embodiments which are illustrated in the accompanying figures, wherein.

DESCRIPTION OF THE PREFERRED EMBODIMENT

Figure 1:
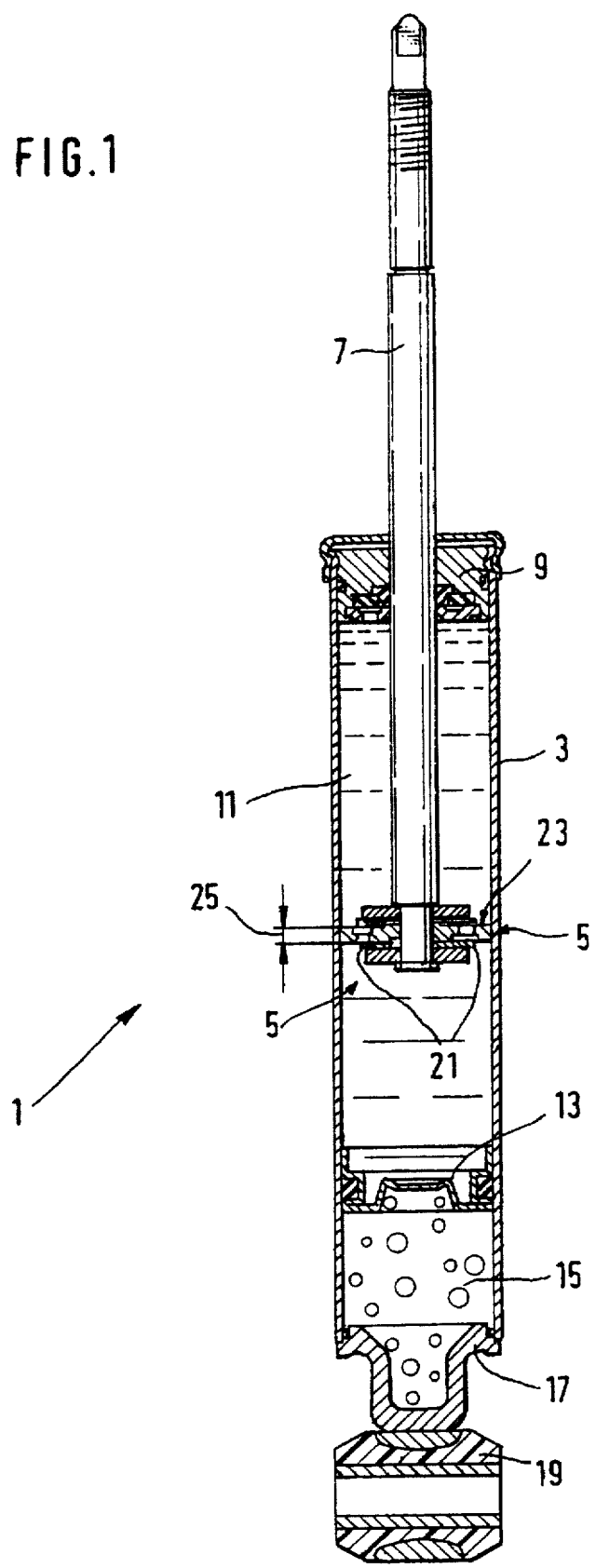
FIG. 1 is a cross section through a vibration damper.

FIG. 1 shows, by way of example, a piston-cylinder assembly 1 which has been realized in the form of a single-tube vibration damper. Basically, the present invention can also be used in other piston-cylinder assemblies.

The single-tube vibration damper 1 consists essentially of a pressure tube 3, in which a piston 5 is located on a piston rod 7 so that the piston 5 can move axially. On the outlet side of the piston rod 7, a piston rod guide 9 closes a working chamber 11 which is filled with damping medium, which working chamber 11 is separated by means of a separating piston 13 from a gas chamber 15 which, on the end, has a bottom 17 with a lug 19.

When the piston rod 7 moves, damping medium is displaced through damping valves 21 in the piston 5. A piston ring 23 which covers a peripheral area 25 of the piston 5 prevents the damping medium from flowing around the piston 5.

Figure 2:
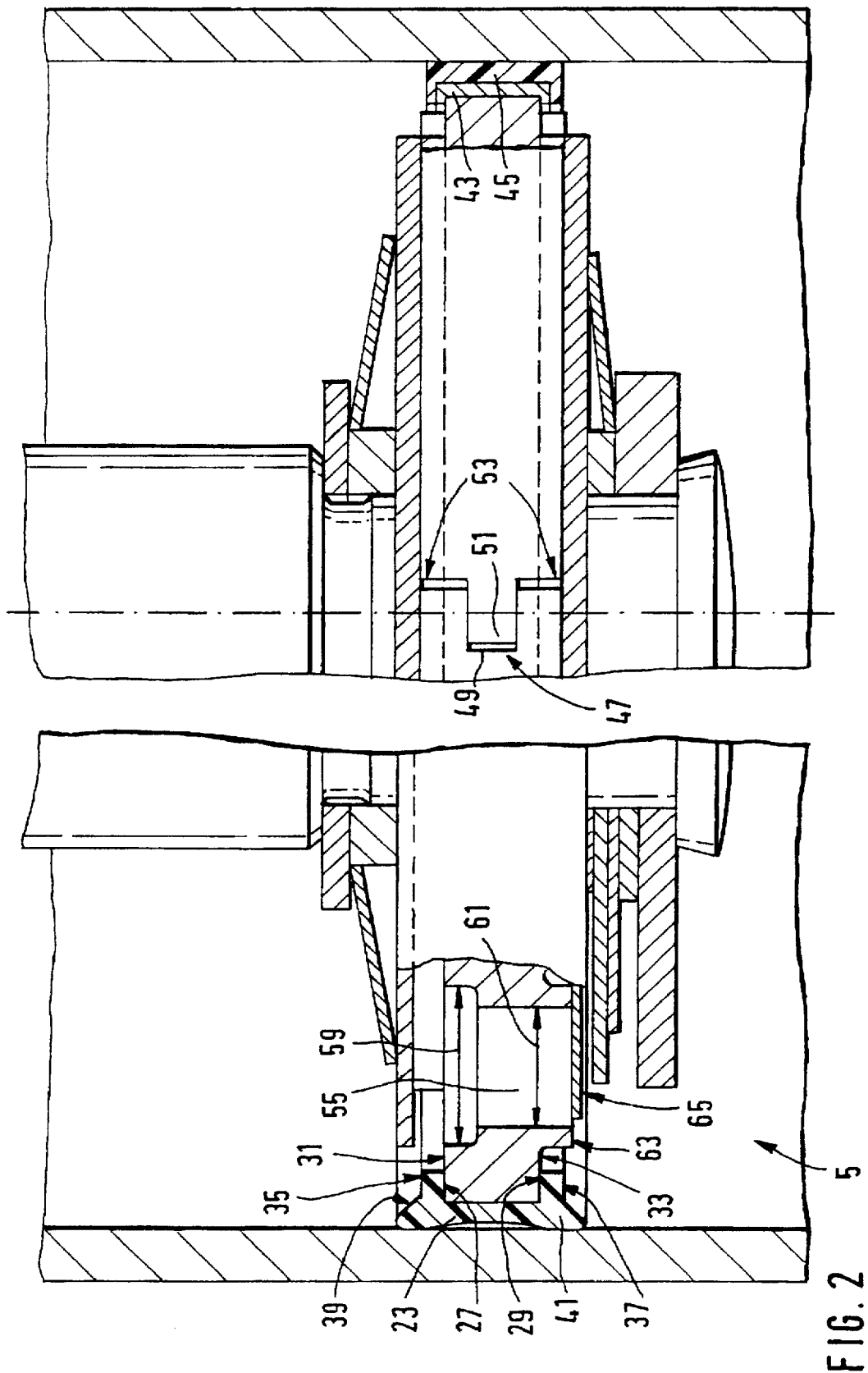
FIG. 2 is a partial cross section of the piston.

FIG. 2, in the left half of the drawing, shows an enlarged illustration of the piston 5 with a piston ring 23 which preferably can be made of plastic. The piston ring 23 is supported by means of retaining surfaces 27 and 29 on the upper side and lower side 31 and 33 of the piston 5. In contact with cover surfaces 35 and 37 of the piston ring 23 are sealing lips 39 and 41 which preferably can be elastic, and which are applied to the surface as a function of the operating pressure in the pressure tube 3. The retaining surfaces 27 and 29 and the retaining surfaces 31 and 33 thereby cooperate to prevent the piston ring 23 from being displaced axially.

In the right half of FIG. 2 a piston ring 23 has been inserted which can be realized in the form of two shells. In contact with the inside of the piston 5 is a reinforcement 43, on which reinforcement 43 an anti-friction layer 45 can be applied. The piston ring 23 is supported by means of its U-shaped cross section and its retaining surfaces 27 and 29 on the upper side and the lower side of the piston 5. The piston ring 23 as preferably manufactured can be slightly larger than the pressure tube 3, and when installed the piston ring 23 can have a slight radial bias.

For installation, the piston ring 23 can have a piston ring joint 47. One end of the piston ring 23 thereby can have a notch 49 at some distance from an upper and lower edge of the piston 5, into which an extension 51 on the other end of the piston ring 23 is inserted. When there is a stroke movement of the piston 5, damping medium is forced into a vertical piston ring joint area 53. The hydraulic pressure acts on the extension and exerts a force in the direction of flow. The piston ring 23 can be supported in the axial direction by means of the retaining surfaces 27 and 29, so that the piston ring joint 47 cannot open. When the flow is in the reverse direction, the piston ring joint 47 acts accordingly. On tall pistons, a plurality of such piston ring joints 47 can preferably be located in the axial direction of the piston ring 23, so that preferably there can be a labyrinth seal.

Worked inside the piston 5 there are passage cross sections 55 and 57 (see FIG. 3) which have inlet and outlet openings 59 and 61 which connect the two parts of the working chamber 11 of the pressure tube 3 which are divided by the piston 5. The outlet openings 61 are bordered by contact surfaces 63 for at least one valve disc 65 each, whereby the contact surfaces 63 can be preferably elevated somewhat with respect to the rest of the piston surface of piston 5.

Figure 3:
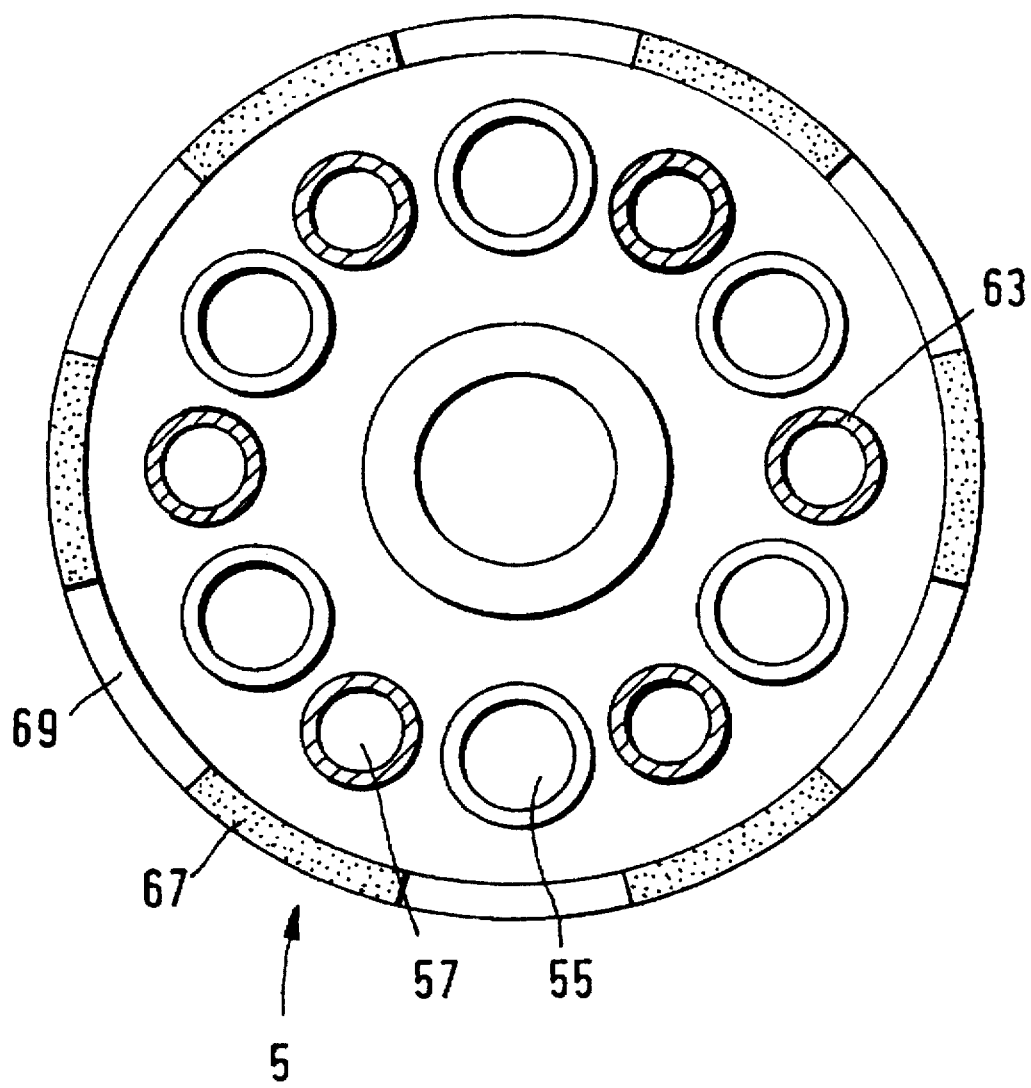
FIG. 3 is an overhead view of the piston.

FIG. 3 shows an overhead view of the piston 5 as an isolated part. The hatch-marked circular areas represent the contact surfaces 63 for the valve disc 65. On the outer edge of the piston 5, piston surfaces 31 and 33 are shown with which the retaining surfaces 27 and 29 of the piston ring 23 are preferably in contact. Each of the generally circular surfaces 31 and 33 can have profiles which consist of elevated portions 67, shown by the shaded portions, and depressions 69. The elevated portions 67 alternate with the depressed portions 69 in the peripheral direction of the piston 5. Toward the radial inside, each elevation 67 or depression 69 is flat with reference to an imaginary reference plane 71 (See FIG. 4) which runs parallel to the side of the piston 5. FIG. 3 also shows that there is a clear correspondence between the elevations 67 and the outlet openings 61 with their contact surfaces and between the depressions 69 and the inlet openings 59.

Figure 4A:
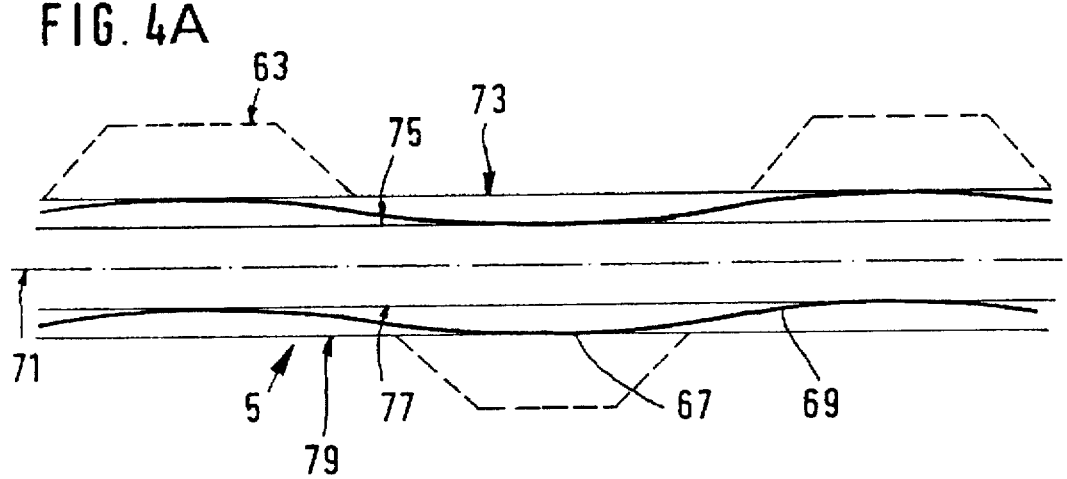
FIG. 4A is a side view of the piston illustrating an embodiment of the present invention.
Figure 4B:
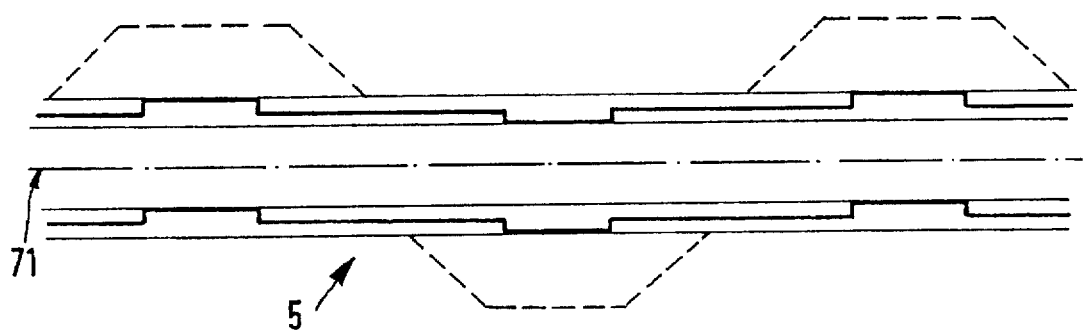
FIG. 4B is a side view of the piston illustrating another embodiment of the present invention.
Figure 4C:
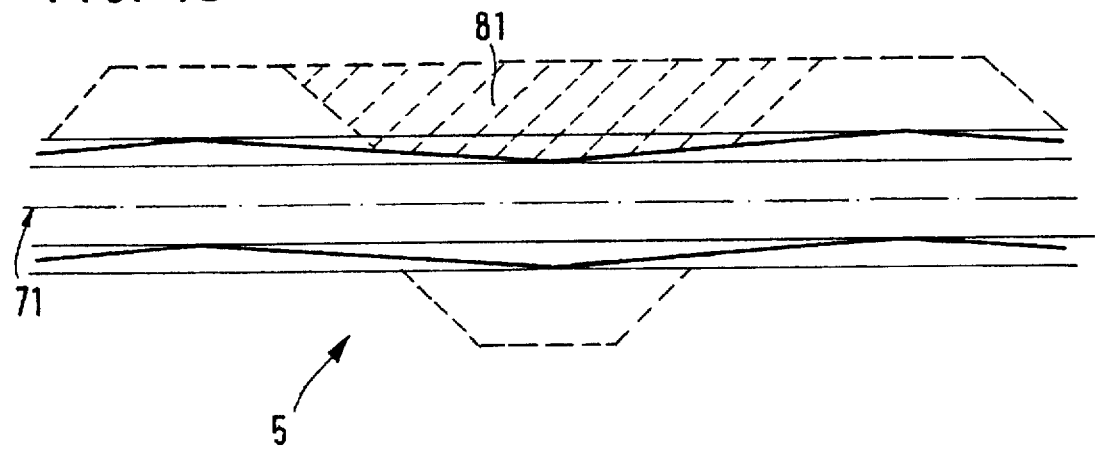
FIG. 4C is a side view of the piston illustrating yet another embodiment of the present invention.

FIGS. 4A, 4B and 4C show the piston 5 without the piston ring 23 in a side, or plan, view. The horizontal center axis represents the reference plane 71. The lines 73, 75, 77 and 79 parallel to the reference plane 71 define the limit points of the elevations 67 and depressions 69. It is apparent that the profiles on the upper side and the lower side of the piston 5 are also realized so that they are oriented in relation to one another. The piston ring 23 thereby preferably has a more or less smoothly flowing peripheral contour with a constant height. Axial stresses inside the U-shaped profile can be minimized. This side view also illustrates the effect of the measure by which a depression 69 is realized, where possible, in the vicinity of an inlet opening 59. It thereby becomes possible to enlarge the radial gap 81 between the elevated contact surface 63 of the corresponding upper side of the piston 5 for the inflow into the inlet opening 59.

In principle, the three embodiments in FIGS. 4A, 4B and 4C can be considered essentially identical. In FIG. 4A the profiles are preferably realized in a wave pattern. In contrast, FIG. 4B shows a preferably stepped contour, and FIG. 4C shows a preferably alternating arrangement of inclined surfaces which are provided with transitional radii on the upper and lower end points. The embodiments illustrated in FIGS. 4A and 4C correspond to mathematically constant functions.

In other words, the supporting surface 31 and supporting surface 33 of the piston 5 support or fasten a corresponding retaining, or fastening, surface 27 and a retaining, or fastening, surface 29 of the piston ring 23. A portion of either supporting surface 31 or supporting surface 33 can be made with an undulating profiled surface. The undulating profiled surface of the corresponding supporting surface 31 or supporting surface 33 provide an elastic fit of the piston 5 about the piston ring 23.

The entire circumferential periphery of the supporting surface 31 or the entire circumferential periphery of the supporting surface 33 can be an undulating surface for supporting or fastening the piston ring 23. As shown in FIGS. 4A–4C, both supporting surface 31 and supporting surface 33 can have undulating portions for supporting or fastening the piston ring 23.

As shown in FIGS. 4A–4C, the undulating surfaces corresponding to supporting surface 31 or supporting surface 33 can preferably be configured in different ways. Each of the undulating surfaces 31 or 33 have a plurality of convex portions and a plurality of concave portions. As shown in FIG. 4A, the undulating surfaces of 31 or 33 have a continuous, or wave pattern, undulation. As shown in FIG. 4B, the undulating surfaces of 31 or 33 can have a stepped contour pattern. Each concave portion and each convex portion is made up of longitudinally offset radial portions extending substantially perpendicular to the longitudinal axis. And as shown in FIG. 4C, the undulating surfaces of 31 or 33 can be made of linear contour portions to form the convex portions and concave portions of the undulating surface.

Also as shown in FIGS. 4A–4C, the undulating surface of supporting surface 31 and the undulating surface of supporting surface 33 can be aligned "in phase" with one another. As shown in each of the FIGS. 4A–4C, the concave portion of the supporting surface 31 can be aligned longitudinally opposite the convex portion of the supporting surface 33. Similarly, the convex portion of the supporting surface 31 can be aligned longitudinally opposite the concave portion of the supporting surface 33. Each of the supporting surfaces 31 and 33 can preferably be configured so that the longitudinal distance between corresponding radial portions of the supporting surface 31 and the supporting surface 33 are a constant distance apart.

Further as shown in FIGS. 4A–4C, the concave portions of each undulating surface 31 and 33 can be peripherally aligned with respect to a corresponding inlet opening for an improved fluid flow path to the inlet opening. For example, the inlet opening 59 can be aligned with a concave portion 69 of the supporting surface 31 as shown in FIGS. 4A–4C. If an inlet opening corresponding to inlet opening 59 is provided on the same side of the piston 5 as is the supporting surface 33, a corresponding concave portion 69 of the supporting surface 33 could be similarly peripherally aligned with the corresponding inlet opening 59 located adjacent the supporting surface 33.

One feature of the invention resides broadly in the vibration damper, comprising a pressure tube 3 in which a piston 5 on a piston rod 7 which can move axially is guided by means of a piston rod guide 9 which closes the pressure tube 3, whereby the piston 5 divides the working chamber 11 of pressure tube 3 which is filled with damping medium into two working chambers, with a piston ring 23 which covers a peripheral area of the piston 5 and has an essentially U-shaped cross section with retaining surfaces 27, 29, whereby the retaining surfaces 27, 29 are supported on the upper and lower side of the piston 5, characterized by the fact that on at least one piston side 31; 33, at least a portion of the piston 5 on which the retaining surfaces 27, 29 of the piston ring 23 are engaged has a profiled surface, so that the distance between one side of the piston 5 and a hypothetical reference plane 71 which runs parallel to the piston side is alternately less than and greater than a specified size of fit.

Another feature of the invention resides broadly in the vibration damper characterized by the fact that the profiling is realized on the upper side and lower side of the piston.

Yet another feature of the invention resides broadly in the vibration damper characterized by the fact that the profiling of the surface is realized so that the profile in the peripheral direction of the piston is alternately greater than and less than the size of fit.

Still another feature of the invention resides broadly in the vibration damper characterized by the fact that the profiles on the surfaces on the upper side and lower side of the piston are oriented with respect to one another so that starting from an imaginary reference plane, an elevated portion 67 is realized on the one piston side, and a depression 69 is realized on the opposite side of the piston in the axial direction of the piston.

A further feature of the invention resides broadly in the vibration damper characterized by the fact that the height of the elevation on the one side of the piston is exactly the same as the depth of the depression on the axially opposite side of the piston.

Another feature of the invention resides broadly in the vibration damper characterized by the fact that the elevations and depressions on the sides of the piston are realized so that they are flat.

Yet another feature of the invention resides broadly in the vibration damper characterized by the fact that the sequence of elevations and depressions corresponds to a constant function.

Still another feature of the invention resides broadly in the vibration damper characterized by the fact that the profiling toward the radial inside of the piston has an essentially constant height.

A further feature of the invention resides broadly in the vibration damper characterized by the fact that the piston has passage channels 55; 57 which connect the two working chambers to one another, whereby the passage channels are each covered at their exit openings 61 by at least one valve disc 65, whereby the profiling is oriented in relation to the outlet openings so that a depression is realized in the vicinity of the inlet openings 59.

Examples of vibration dampers which could possibly be adapted for use in the present invention, along with additional components generally associated with vibration dampers which might be interchangeable with, or adaptable as, components of the embodiments as described hereinabove might be disclosed by the following U.S. Patents, all of which are assigned to the assignee of the present invention: U.S. Pat. No. 5,251,730; U.S. Pat. No. 5,301,776; U.S. Pat. No. 5,335,757; U.S. Pat. No. 5,392,885 and U.S. Pat. No. 5,435,421.

Examples of piston assemblies which could possibly be adapted for use in the present invention, along with additional components which might be interchangeable with, or adaptable as, components of the embodiments as described hereinabove might be disclosed by the following U.S. Pat. No. 4,948,336; U.S. Pat. No. 5,392,693; U.S. Pat. No. 5,431,415; U.S. Pat. No. 5,445,392 and U.S. Pat. No. 5,474,307.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 195 33 328.4, filed on Sep. 11, 1995, having inventors Manfred Grundei, Günther Braun, Otto Samonil, and Sabine Lack (Maiden name=Rucks), and DE-OS 195 33 328.4 and DE-PS 195 33 328.4, as well as their published equivalents, are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. Vibration damper, comprising a pressure tube in which a piston on a piston rod which can move axially is guided by means of a piston rod guide which closes the pressure tube, whereby the piston divides the pressure tube which is filled with damping medium into two working chambers, with a piston ring which covers a peripheral area of the piston and has an essentially U-shaped cross section with retaining surfaces, said retaining surfaces being disposed on the inside of the U-shaped cross section, whereby the retaining surfaces are supported on the upper and lower side of the piston, characterized by the fact that on at least one piston side, at least a portion of the piston on which the retaining surfaces of the piston ring are engaged has a profiled surface, so that the distance between one side of the piston and a hypothetical reference plane which runs parallel to the piston side is alternately less than and greater than a nominal distance with respect to the piston.

2. Vibration damper as claimed in claim 1, characterized by the fact that the profiling is realized on the upper side and lower side of the piston.

3. Vibration damper as claimed in claim 1, characterized by the fact that the profiling of the surface is realized so that the profile in the peripheral direction of the piston is alternately greater than and less than the nominal distance with respect to the piston.

4. Vibration damper as claimed in claim 1, characterized by the fact that the profiles on the surfaces on the upper side and lower side of the piston are oriented with respect to one another so that starting from an imaginary reference plane, an elevated portion is realized on the one piston side, and a depression is realized on the opposite side of the piston in the axial direction of the piston.

5. Vibration damper as claimed in claim 4, characterized by the fact that the height of the elevation on the one side of the piston is exactly the same as the depth of the depression on the axially opposite side of the piston.

6. Vibration damper as claimed in claim 4, characterized by the fact that the elevations and depressions on the sides of the piston are realized so that they are flat.

7. Vibration damper as claimed in claim 1, characterized by the fact that the sequence of elevations and depressions corresponds to a constant function.

8. Vibration damper as claimed in claim 1, characterized by the fact that the profiling toward the radial inside of the piston has an essentially constant height.

9. Vibration damper as claimed in claim 1, characterized by the fact that the piston has passage channels which connect the two working chambers to one another, whereby the passage channels are each covered at their exit openings by at least one valve disc, whereby the profiling is oriented in relation to the outlet openings so that a depression is realized in the vicinity of the inlet openings.

10. A vibration damper, as for a motor vehicle, said vibration damper comprising:

a cylinder;

said cylinder having a longitudinal axis;

said cylinder comprising means for attachment to a first part of a motor vehicle;

piston means being disposed within said cylinder;

said piston means dividing said cylinder into a first chamber portion and a second chamber portion;

each of said first chamber portion and said second chamber portion containing a damping fluid;

said piston means comprising:

a piston;

a piston rod;

said piston being connected to an end of said piston rod;

said piston rod comprising means for attachment to a second part of a motor vehicle;

a piston ring;

said piston ring being disposed about said piston;

said piston ring being disposed to sealingly contact an inner diameter portion of said cylinder;

said piston ring comprising:

a first fastening surface;

said first fastening surface being disposed substantially perpendicular to the longitudinal axis;

a second fastening surface;

said second fastening surface being disposed substantially perpendicular to the longitudinal axis;

said first fastening surface being disposed to face said second fastening surface;

said first fastening surface being disposed a substantial longitudinal distance from said second fastening surface;

said piston comprising:
a first support surface;
said first support surface being disposed substantially transverse to the longitudinal axis;
said first support surface supporting said first fastening surface of said piston ring;
a second support surface; said second support surface being disposed substantially transverse to the longitudinal axis;
said second support surface supporting said second fastening surface of said piston ring;
at least a portion of said first support surface comprising an undulating profiled surface; and
said undulating profiled surface providing an elastic fit of each of said first fastening surface and said second fastening surface of said piston ring against the corresponding first support surface and second support surface of said piston for fastening said piston ring to said piston.

11. The vibration damper according to claim 10 wherein said undulating profiled surface comprises the entire portion of said first support surface.

12. The vibration damper according to claim 11 wherein:
said undulating profiled surface is a first undulating profiled surface;
at least a portion of said second support surface comprises a second undulating profiled surface; and
said second undulating profiled surface providing an elastic fit of each of said first fastening surface and said second fastening surface of said piston ring against the corresponding first support surface and second support surface of said piston for fastening said piston ring to said piston.

13. The vibration damper according to claim 12 wherein said second undulating profiled surface comprises the entire portion of said second support surface.

14. The vibration damper according to claim 13 wherein:
said first undulating profiled surface comprises at least one concave surface portion and at least one convex surface portion;
said second undulating profiled surface portion comprises at least one concave surface portion and at least one convex surface portion;
each of said at least one convex surface portion of said first undulating profiled surface is disposed longitudinally opposite a corresponding concave surface of said second undulating profiled surface; and
each of said at least one concave surface portion of said first undulating profiled surface is disposed longitudinally opposite a corresponding convex surface of said second undulating profiled surface.

15. The vibration damper according to claim 14, wherein:
each of said at least one convex surface portion of said first and second undulating surfaces has a longitudinal height;
each of said at least one concave surface portion of said first and second undulating surfaces has a longitudinal depth; and
the longitudinal height of said convex surface portions is substantially similar to the longitudinal depth of said concave surface portions.

16. The vibration damper according to claim 15, wherein:
said piston comprises a first longitudinal portion and a second longitudinal portion;
each of said first and second longitudinal portions is disposed substantially parallel with the longitudinal axis;

said first longitudinal portion has two ends and a longitudinal length;
an end of said first longitudinal portion is disposed on said first undulating surface;
an opposite end of said first longitudinal portion is disposed on said second undulating surface;
said second longitudinal portion has two ends and a longitudinal length;
an end of said second longitudinal portion is disposed on said first undulating surface;
an opposite end of said second longitudinal portion is disposed on said second undulating surface; and
the longitudinal length of said first longitudinal portion is substantially similar to the longitudinal length of said second longitudinal portion.

17. The vibration damper according to claim 16, wherein both of said first and second undulating surfaces comprise one of the following configurations A), B) and C):

A) a wave pattern;
said wave pattern forming a substantially continuous undulating surface;
said wave pattern configured to form said at least one concave portion and said at least one convex portion of the corresponding first and second undulating surfaces;

B) a stepped contour pattern;
said stepped contour pattern comprising a plurality of stepped contour portions;
each of said plurality of said stepped contour portions being disposed substantially perpendicular to the longitudinal axis;
each of said plurality of said stepped contour portions disposed a substantial longitudinal distance from an adjacent stepped contour portion;
said stepped contour pattern configured to form said at least one concave portion and said at least one convex portion of the corresponding first and second undulating surfaces; and C) a linear contour pattern;
said linear contour pattern comprising a plurality of inclined planar surfaces substantially transverse to the longitudinal axis;
said plurality of inclined planar surfaces comprising alternating first planar portions and second planar portions;
each of said first planar portions being disposed to form a first angle with respect to the longitudinal axis;
each of said second planar portions being disposed to form a second angle with respect to the longitudinal axis; and
said linear contour pattern configured to form said at least one concave portion and said at least one convex portion of the corresponding first and second undulating surfaces.

18. The vibration damper according to claim 17, further comprising:
at least one passage channel disposed within said piston for fluid communication from one work chamber to said other work chamber;
an inlet opening of said at least one passage channel is in fluid communication with said one work chamber;
said inlet opening being disposed on the same side of said piston as a corresponding first and second undulating surface;
an outlet opening of said at least one passage channel is in fluid communication with said other work chamber;

a valve disc disposed to cover said exit opening of said least one passage channel; and each of said at least one concave surface portions of said corresponding first and second undulating surfaces is disposed radially outward from each inlet opening of said at least one passage channel.

19. The vibration damper according to claim 18, further comprising:

at least one additional passage channel disposed within said piston for fluid communication from said other work chamber to said one work chamber;

an inlet opening of said at least one additional passage channel is in fluid communication with said other work chamber;

said inlet opening of said at least one additional passage being disposed on the other of said corresponding first and second undulating surface;

an outlet opening of said at least one additional passage channel is in fluid communication with said one work chamber;

an additional valve disc disposed to cover said exit opening of said least one additional passage channel; and each of said at least one concave surface portions of said other first and second undulating surfaces is disposed radially outward from each inlet opening of said at least one additional passage channel;

said cylinder comprises a pressure tube;

a piston rod guide closing said pressure tube; and said piston ring has an essentially "U" shaped cross section.

20. A vibration damper, as for a motor vehicle, said vibration damper comprising:

a pressure tube having a longitudinal axis;

said pressure tube comprising means for attachment to a first portion of a motor vehicle;

a piston rod guide closing an end of said pressure tube;

a piston rod extending into said pressure tube and longitudinally guided by said piston rod guide;

said piston rod comprising means for attachment to a second portion of the motor vehicle;

a piston disposed in said pressure tube and attached to an end of said piston rod;

said piston dividing said pressure cylinder into a first work chamber portion and a second work chamber portion;

a piston ring disposed about said piston and against the inner diameter of said pressure cylinder for sealing said first and second work chambers;

said piston ring having an essentially U-shaped cross section with retaining surfaces;

said retaining surfaces being disposed on the inside of said U-shaped cross section;

said retaining surfaces of said piston ring comprising first and second retaining surfaces;

means for fastening said piston ring;

said means for fastening said piston ring comprising:

a first support surface being disposed on said piston; said first support surface being disposed to support said first retaining surface of said piston ring;

a second support surface being disposed on said piston;

said second support surface being disposed to support said second retaining surface of said piston ring;

said first support surface being disposed adjacent said first retaining surface of said piston ring;

said second support surface being disposed adjacent said second retaining surface of said piston ring;

a first planar portion being disposed within said piston;

said first planar portion being disposed between said first support surface and said second support surface;

said first planar portion being disposed substantially perpendicular to the longitudinal axis;

said first planar portion defining a first reference plane substantially perpendicular to the longitudinal axis;

said first support surface comprising a plurality of surface portions;

each of said plurality of surface portions being disposed a longitudinal distance from said first reference plane;

said plurality of surface portions being disposed to define a second reference plane substantially perpendicular to the longitudinal axis;

at least a portion of said first support surface comprising a profiled surface; and said profiled surface comprising:

at least one elevated surface;

said at least one elevated surface being disposed on the opposite side of the second reference plane from the first reference plane;

at least one depressed surface; and said at least one depressed surface being disposed between the first reference plane and the second reference plane.

* * * * *

UNITED STATES PATENT AND TRADEMARK OFFICE
CERTIFICATE OF CORRECTION

PATENT NO. : 5,730,263
DATED : March 24, 1998
INVENTOR(S) : Manfred GRUNDEI, Günther BRAUN, Otto SAMONIL, and Sabine LACK It is certified that error appears in the above-identified patent and that said Letters Patent is hereby corrected as shown below:

On the title page, item [56], under the FOREIGN PATENT DOCUMENTS section, after the 'Germany' reference, insert the following reference:

--19501792  8/1996  Germany--.

In column 2, line 43, after 'their', delete "cutlet" and insert --outlet--.

Signed and Sealed this

First Day of September, 1998

Attest:

BRUCE LEHMAN

Attesting Officer

Commissioner of Patents and Trademarks